April 28, 1970
L. J. GIRARD
3,509,458
GALVANOMETER INDICATING DEVICE HAVING THE
COILS THEREOF OFFSET FOR PROVIDING
A LOGARITHMIC INDICATION
Filed June 1, 1967
3 Sheets-Sheet 1
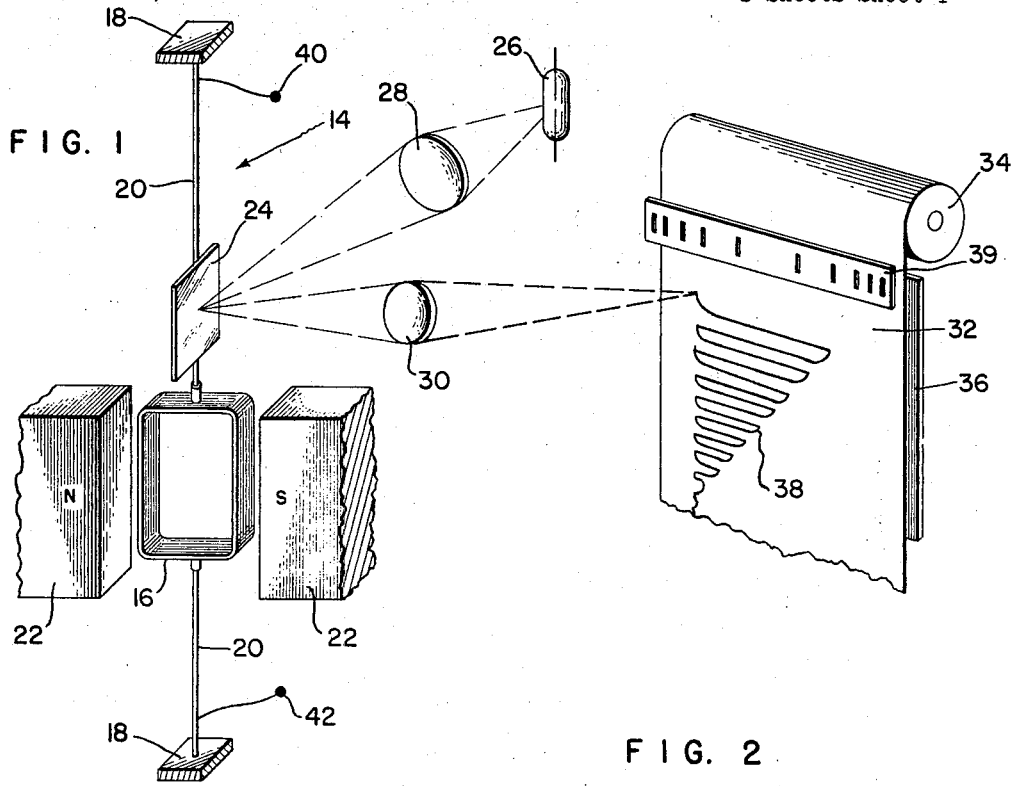
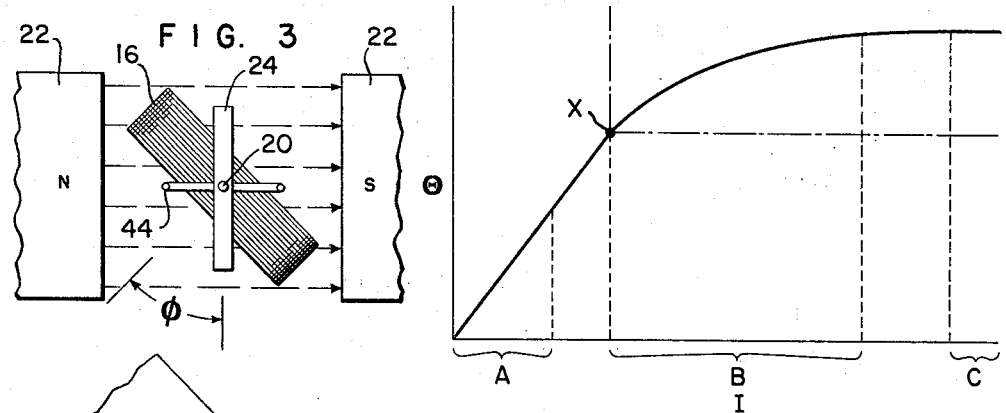
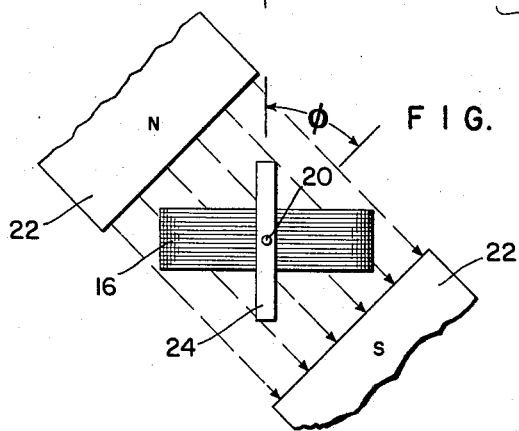
INVENTOR.
LARRY J. GIRARD
BY *M. Michael Carpenter*
ATTORNEY FIG. 5
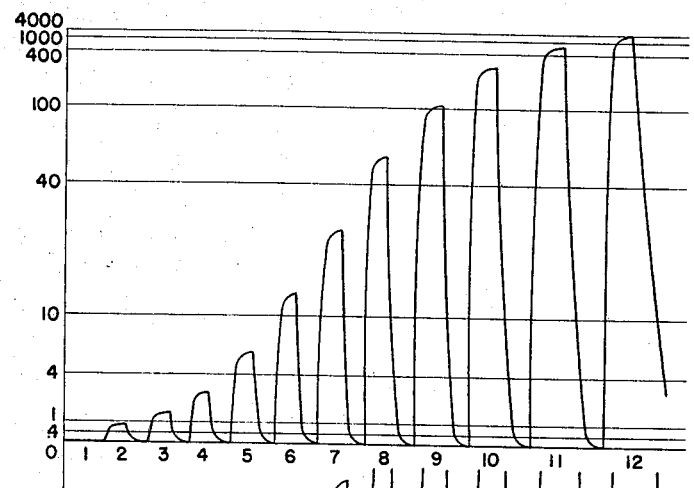
NONLINEAR
GALVANOMETER
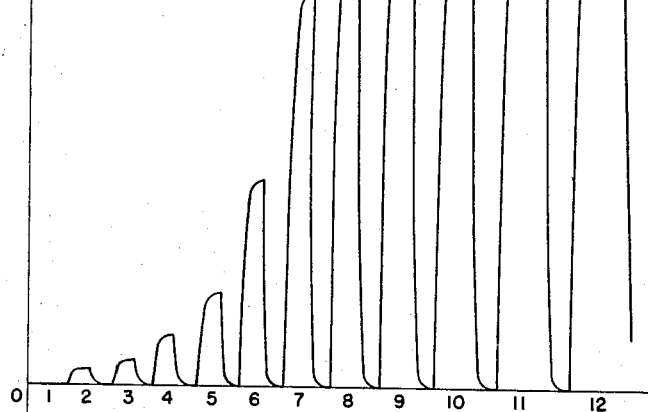
LINEAR
HIGH-SENSITIVITY
GALVANOMETER
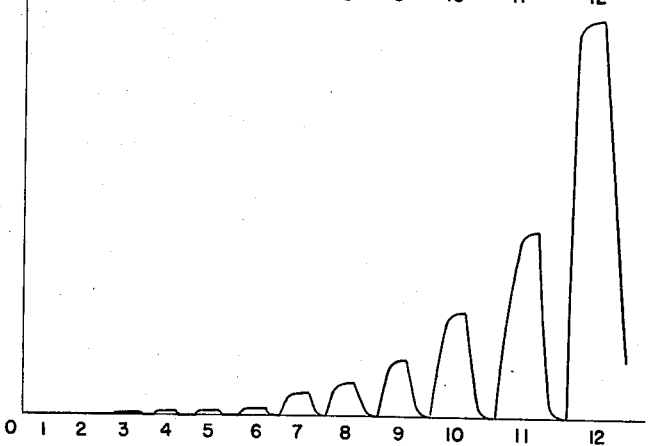
LINEAR
LOW-SENSITIVITY
GALVANOMETER
*INVENTOR.*
LARRY J. GIRARD
BY
ATTORNEY.

April 28, 1970  L. J. GIRARD  3,509,458
GALVANOMETER INDICATING DEVICE HAVING THE
COILS THEREOF OFFSET FOR PROVIDING
A LOGARITHMIC INDICATION Filed June 1, 1967  3 Sheets-Sheet 3

INVENTOR.
LARRY J. GIRARD
BY *M. Michael Carpenter*
ATTORNEY.

United States Patent Office 3,509,458
Patented Apr. 28, 1970

3,509,458
GALVANOMETER INDICATING DEVICE HAVING THE COILS THEREOF OFFSET FOR PROVIDING A LOGARITHMIC INDICATION
Larry J. Girard, Littleton, Colo., assignor to Honeywell Inc., Minneapolis, Minn., a corporation of Delaware
Filed June 1, 1967, Ser. No. 642,747
Int. Cl. G01r 13/38
U.S. Cl. 324—97                                        2 Claims

ABSTRACT OF THE DISCLOSURE

A nonlinear galvanometer having a coil suspended within a magnetic field and a mirror attached to the suspension system for reflecting a light beam from a light source to provide an indication of an input signal applied to the coil. The coil is offset with respect to the magnetic field so that the input signal produces a nonlinear coil deflection for providing a nonlinear indication.

---

The present invention relates to a nonlinear indicating device and, more particularly, to a galvanometer configuration which is capable of providing a nonlinear output that produces a usable indication of an input signal over a wide range of amplitudes.

Conventional oscillographic galvanometer produces a linear output in response to an input signal current. If the current of the input signal were increased beyond its conventional range, the output produced thereby would be reflected as a logarithmic response of the galvanometer. In the upper limits of input signal current, the deflection of the galvanometer becomes heavily compressed whereby its output approaches a limit beyond which no change of input signal is indicated. In many conventional applications, it is desirable to utilize the linear portion of the galvanometer response curve thus described. However, in some recording applications, where the input signal varies over an extensive range of amplitudes, it is desirable to provide a galvanometer that is capable of recording the complete range of the input signal amplitudes without causing the indication produced thereby to be deflected off the scale associated therewith.

Accordingly, it is an object of the present invention to provide a nonlinear indicating device capable of recording over a wide dynamic range of input signal amplitudes.

Another object of this invention is to provide a nonlinear galvanometer having a near linear output in the low range, a logarithmic output in the middle range, and an output which is heavily compressed in the upper range for allowing the input signal to be continuously recorded regardless of the amplitude thereof.

Still another object of the invention presented herein is to provide a nonlinear galvanometer with a damping arrangement for preventing oscillation thereof during the nonlinear recording of a wide range of input signal amplitudes.

A further object of the invention herein presented is to provide a nonlinear indicating device that is capable of recording a wide range of input signal amplitudes regardless of their positive and negative polarity.

Other objectives and many of the attendant advantages of the present invention will become readily apparent to those skilled in the art, as a better understanding thereof is obtained by reference to the following detailed description, when considered in connection with the accompanying drawings, wherein:

FIG. 1 is a schematic representation of a vibratory assembly utilized within a galvanometer in which the present invention may be incorporated;

FIG. 2 is a curve showing galvanometer deflection versus input signal current for a conventional galvanometer;

FIG. 3 is a plan view of the galvanometer shown in FIG. 1 illustrating the angular relationship of a galvanometer coil within the magnetic field associated therewith;

FIG. 4 is a plan view, similar to that shown in FIG. 3, illustrating a second embodiment of the galvanometer coil within the associated magnetic field;

FIG. 5 is a curve showing various input signal amplitudes, as recorded by the galvanometer of the present invention, versus input signal amplitudes of the same magnitude recorded by prior art galvanometers;

Figure 7:
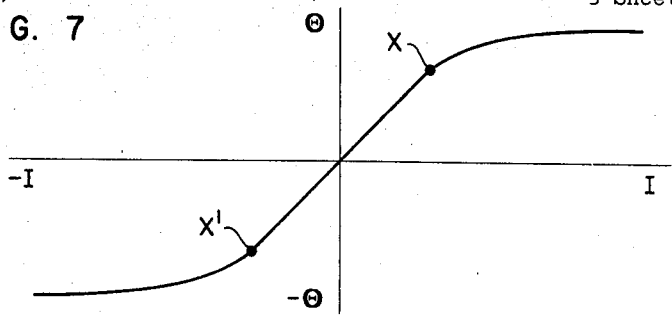
FIG. 7 is a curve, similar to FIG. 2, showing galvanometer deflection versus input signal current for conventional galvanometer vibratory assemblies.

The oscillographic galvanometer of the present invention includes a suspension system supporting a galvanometer coil within a fixed magnetic field. A mirror is attached to the suspension system for deflecting a light beam, from an ultraviolet light source, through a lens system onto a recording medium, such as a sheet of light-sensitive paper. Deflection of the mirror is caused by passing current through the coil which creates a magnetic field due to the coil current. This field reacts with the fixed magnetic field formed by poles of a permanent magnetic field to produce a torque that tends to align the two fields. The coil and mirror deflect under the influence of this torque against the spring resistance of the suspension system until the resultant restraining spring torque equals the field alignment torque. When the torques are equalized, the deflection stops at a deflection angle $\theta$ which is proportional to the alignment torque. The alignment torque depends not only on coil current, to which it is linearly related, but also upon the deflection angle $\theta$. The deflection angle $\theta$ introduces a nonlinearity according to the relationship:

$$\theta = KI \cos \theta$$

where $\theta$ = deflection angle.
K = a system constant, including a linear suspension torque constant.
I = coil current.

This equation describes a transfer characteristic that is linear for lower input signal currents and logarithmic for middle-range input signal currents. As the input signal current reaches the maximum limits of the oscillographic galvanometer, the transfer characteristic thereof asymptotically approaches an upper limit determined by the galvanometer system.

In many recording applications utilizing an oscillographic galvanometer, it is desirable to operate within the linear range of the transfer characteristic. However, when recording information that varies over a wide-ranged input signal amplitude, it is often desirable to obtain a record of the upper limits or maximum variations of this information. Utilizing a conventional linear galvanometer having a low sensitivity will allow the upper limits of the input signal current to be recorded but will eliminate any useful recording in its lower limits. Conversely, utilizing a conventional galvanometer having a high sensitivity will allow the recording of input signal current in the lower limits thereof, while in the upper limits, the input signal current causes the recording to be driven off scale. This problem is eliminated in the present invention by biasing the galvanometer out of the linear region of its transfer characteristic and into the nonlinear region thereof. One arrangement for embodying this biasing arrangement into the galvanometer is by offsetting the galvanometer coil with respect to the magnetic field. Other embodiments are possible and will be described in greater detail hereinbelow.

Referring now to the drawings, an oscillographic galvanometer is shown generally at 14 in FIG. 1 having a galvanometer coil 16 suspended from a main frame 18 by suitable suspension filaments 20. The galvanometer coil 16 is suspended within a fixed magnetic field formed by suitable magnetic pole pieces 22. A mirror 24 is attached to the upper suspension filament 20, as by bonding. A source of ultraviolet light 26 is focused through a first lens 28 onto the mirror 24 and reflected therefrom through a second lens 30 which focuses a beam of light onto a light-sensitive recording medium 32. The recording medium 32 is stored upon a reel 34 and passed over a platen 36 where a recording trace 38 is formed upon the recording medium. An input signal current is applied to the galvanometer coil 16 through input terminals 40 and 42 which are attached to the outer portions of the suspension filaments 20.

An input signal current passing through the coil 16 produces a flux therein which is generally parallel to the axis of symmetry of the coil. This produced flux tends to align itself with the flux of the fixed magnetic field formed by pole pieces 22 and, thereby, causes the galvanometer coil 16 to be rotatively deflected in a clockwise direction. FIG. 2 illustrates a conventional curve plot of the galvanometer deflection angle $\theta$ versus the input signal current I. It should be noted that the deflection of the galvanometer is substantially linear when the input signal current is in the lower region A of the curve. In the middle range B of the curve, the galvanometer deflection is logarithmic. Finally, in the upper region C of the curve, the deflection of the galvanometer is highly compressed and asymptotically approaches an upper limit determined by the galvanometer system. If the output of the oscillographic galvanometer were initially offset along the transfer characteristic curve of FIG. 2, it can be seen that a nonlinear output characteristic for the galvanometer could be obtained.

One arrangement for obtaining a nonlinear oscillographic galvanometer is shown in FIG. 3. Here the galvanometer coil 16 is initially offset from its normal position. That is, normally the galvanometer coil 16 is positioned with its axis of symmetry parallel to the galvanometer mirror 24 and perpendicular to the flux lines of the fixed magnetic field formed by pole pieces 22. The axis of symmetry of the galvanometer coil is the axis passing through the center thereof about which the wire forming the coil is wrapped. The galvanometer coil 16 is offset an angle $\phi$ that is measured between the axis of symmetry of the coil and a line perpendicular to the flux lines of the magnetic field. Due to the initial offset angle $\phi$ of galvanometer coil 16, the transfer characteristic of the galvanometer of FIGS. 1 and 3 has been offset along the curve shown in FIG. 2 to a point marked X. Therefore, an initial input signal current will produce a clockwise galvanometer deflection that is nonlinear and increases along a generally logarithmic curve toward an asymptotical upper limit.

The recording trace 38 upon recording medium 32 may be directly calibrated by placing a specially arranged grid bar 39 between the recording medium and the ultraviolet light source 26. The grid bar 39 is provided with a plurality of spaced apertures which allow light from source 26 to be focused upon recording medium 32 for forming a calibration grid thereon. The spacing of the apertures is determined from the transfer characteristic curve of the galvanometer, as illustrated in FIG. 2. A special grid bar 39 would not be required if a ruler is provided having suitable indicia thereon which are spaced in a manner similar to that of the apertures of the grid bar 39.

Due to the offset angle $\phi$ of galvanometer coil 16, the coil is oriented within the fixed magnetic field of pole pieces 22 in such a way that it produces very little back EMF when rotated. This lack of induced voltage results in greatly reduced damping, making it necessary to add a damping coil 44 to the galvanometer. The second coil is aligned with its axis of symmetry perpendicular to the flux lines of the magnetic field formed by pole pieces 22. The windings of the second coil 44 are shorted for providing immediate electromagnetic damping as the galvanometer is rotationally deflected. Further details concerning the alignment of the damping coil 44, galvanometer coil 16, and the magnetic field may be found in a copending patent application, Ser. No. 651,533, filed Jan. 6, 1967, and assigned to the same assignee as the present invention.

FIG. 4 illustrates a second embodiment of the present invention wherein galvanometer coil 16 and galvanometer mirror 24 retain their conventional relationship to each other. The pole pieces 22 are offset with respect to the galvanometer coil 16 for producing an offset relationship between the flux lines of the fixed magnetic field formed by the pole pieces and the axis of symmetry of the coil. This offset is indicated as offset angle $\phi$. The result of this embodiment produces the same coordinate shift for establishing a nonlinear galvanometer as the embodiment of FIG. 3 except that the galvanometer coil is optionally arranged for a counterclockwise deflection.

One advantage provided by the present invention is illustrated graphically in FIG. 5. The curve represented by the upper portion of FIG. 5 shows the magnitude of an input signal in millivolts versus a series of 12 input pulses having various amplitudes. By utilizing a nonliner galvanometer of the present invention, a reference pulse 1 is recorded having zero amplitude, followed by a second pulse having an amplitude measured at approximately 0.4 millivolt. The pulses are then increased until the last pulse 12 obtains an amplitude measured at 4,000 millivolts. Thus, an input signal ratio of 10,000:1 can be achieved through the utilization of the present invention. The middle portion of FIG. 5 illustrates the curves that are produced if a conventional linear high-sensitivity galvanometer is used to record the same pulses recorded by the nonlinear galvanometer of the present invention. Here, the amplitude of the second pulse 2 has been established to equal the amplitude of the second pulse 2 in the upper portion of FIG. 5. It becomes obvious that utilization of a high-sensitivity galvanometer renders it impossible to record an indication of the upper limits of the input signal. The lower portion of FIG. 5 illustrates the recorded results of a conventional linear low-sensitivity galvanometer. Here, the amplitude of the last pulse 12 is matched with the amplitude of last pulse 12 formed by the nonlinear galvanometer of the present invention. The first six pulses of the input signal are practically nonexistent and, therefore, impossible to decipher. Thus, it can be seen that the nonlinear galvanometer of the present invention is adapted for recording a wide range of input signal amplitudes.

Figure 6:
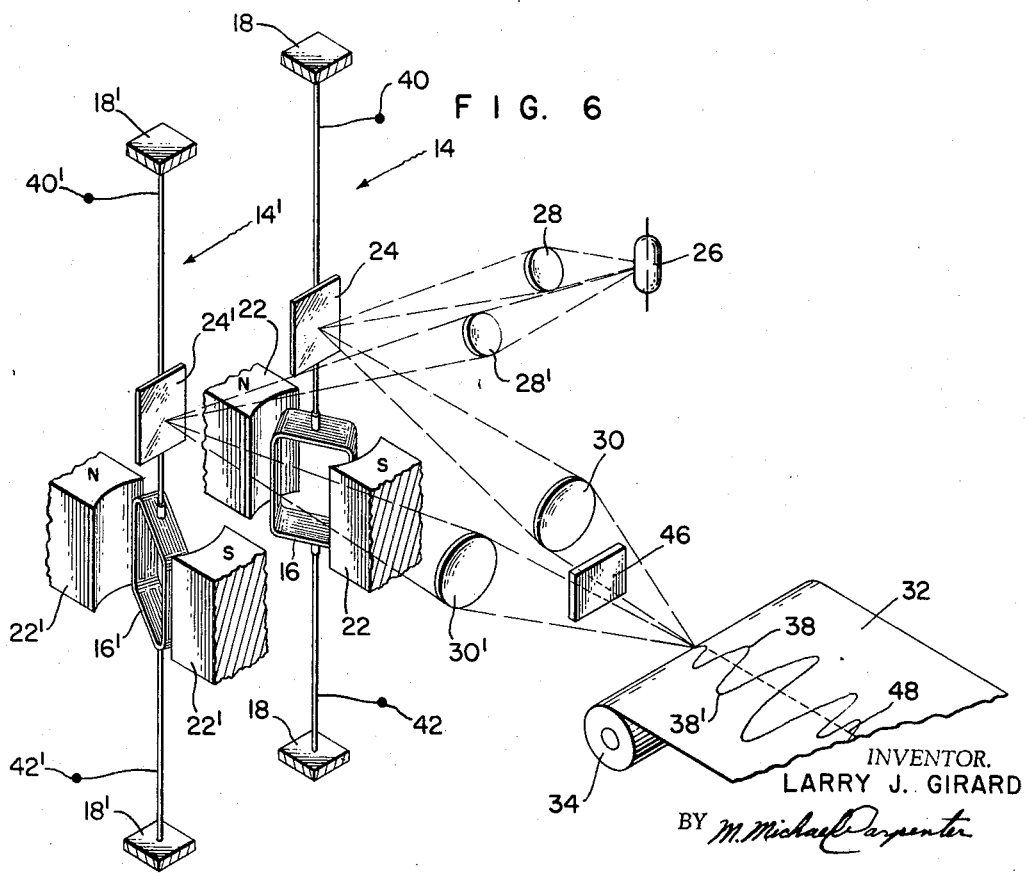
FIG. 6 is a schematic representation of a pair of vibratory assemblies utilized within a galvanometer incorporating the present invention for recording a positive and negative input signal.

The embodiment described thus far is suitable for recording only in a single direction. This is due to the offset angle of the galvanometer coil with respect to the magnetic field which, in the present embodiment, produces a substantially linear transfer characteristic in the opposite direction. This limitation can be overcome by an arrangement illustrated in FIG. 6. Here, a pair of oscillographic galvanometers, similar to that shown in FIG. 1, are arranged in parallel relationship. Light from an ultraviolet source 26 is focused through a pair of first lenses 28 and 28' onto a pair of first and second galvanometer mirrors 24 and 24'. The light beams thus formed are reflected therefrom and focused through a second pair of lenses 30 and 30' onto the recording medium 32. A positve and negative going input signal is commonly applied to input terminals 40 and 42 of the first galvanometer and to 40' and 42' of the second galvanometer. Assuming that a positive going input signal causes galvanometer coils 16 and 16' to deflect in a counterclockwise direction, when viewed from above, galvanometer 14 will be deflected by a positive pulse for recording a positive trace 38 on recording medium 32 above a center line 48 thereon. Mask 46 is provided to screen the light beam reflected from the second galvanometer 14' thereby preventing it from reaching the light-sensitive recording medium 32. When a negative going input signal is applied to the input terminals, galvanometer 14' focuses its reflected light beam upon the recording medium 32 below the center line 48 thereon for forming a negative trace 38'. The light beam from galvanometer 14 is then prevented from reaching the light-sensitive recording medium 32 by screen 46.

Figure 8:
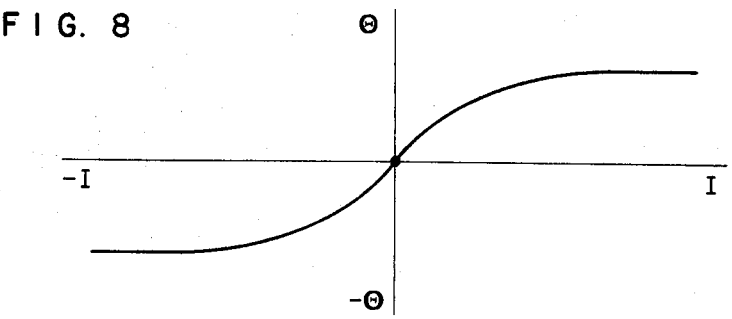
FIG. 8 is a curve showing galvanometer deflection versus input signal current for a galvanometer incorporating the present invention in FIG. 6.

FIG. 7 illustrated a plot of the galvanometer deflection versus the input signal current for a conventional galvanometer. It can be seen that a positive or negative input signal current will cause an initial linear displacement of the galvanometer coil in either a positive or negative direction. As the input signal increases into its middle range, the transfer characteristic thereof becomes logarithmic. By offsetting the galvanometer coils 16 and 16' in opposite directions with respect to the magnetic field, as described hereinabove, the coordinates of the curve shown in FIG. 7 are shifted to points X and X' indicated on the curve. The result of this shift is illustrated in FIG. 8 which is a representation of the transfer characterstics of the embodiment illustrated in FIG. 6.

While the embodiment described hereinabove is illustrated with a mask 46 for preventing unwanted deflection of the galvanometers from forming a trace upon the recording medium 32, other arrangements will become obvious to those skilled in the art. For example, a stop may be used to prevent each galvanometer from deflecting onto the unwanted region. Diodes could be placed within the input circuit to prevent the positive or negative going input signal from reaching one or the other of the galvanometer coils. Further, one galvanometer could be utilized by adding a second coil thereto with a suitable suspension filament.

Obviously, many modifications and variations of the present invention should be limited only by the appended claims in the art in light of the above teaching; and it should therefore be understood that the embodiments described hereinabove are illustrations rather than limitations of the scope of the present invention. Consequently, the present invention should be limited only by the appended claims.

The embodiments of the invention in which an exclusive property or privilege is claimed are defined as follows:

1. A logarithmic indicating device for indicating positive and negative going input signals comprising: means for establishing a magnetic field; first and second coil means responsive to said magnetic field; suspension means supporting said first and second coil mean within said magnetic field; said first and second coil means arranged within said magnetic field for deflection in a common direction as said input signals are received thereby; indicating means attached to said suspension means for providing an indication of said input signals; said first coil means supported by said suspenion means with the plane of said coil forming an acute angle to said magnetic field, said acute angle arranged to increase as said input signals go positive; said second coil means supported by said suspension means with the plane of said coil forming a second acute angle to said magnetic field, said second acute angle arranged to increase as said input signals go negative; means preventing said first coil means from producing an indication in the negative going region of said input signals; and means for preventing said second coil means from producing an indication in the positive going region of said input signals; whereby said input signals are logarithmically indicated in said positive and negative going regions.

2. A logarithmic indicating device as claimed in claim 1 wherein said indicating means attached to said suspension means includes a mirror and light source arrangement, and said means preventing said first and second coils from producing an indication in the negative and positive going regions of said input signals include masking means.

References Cited

UNITED STATES PATENTS

| | | | |
|---|---|---|---|
| 2,101,203 | 12/1937 | Toulmin | 324—97 |
| 2,351,353 | 6/1944 | McCarty | 324—97 |
| 2,567,660 | 9/1951 | Van Urk | 324—132 |
| 2,640,866 | 6/1953 | Powell | 324—97 X |
| 2,658,179 | 11/1953 | Eadie | 324—132 |
| 3,245,083 | 4/1966 | Wilson et al. | 324—97 X |
| 3,370,229 | 2/1968 | Hamburger et al. | 324—154 X |
| 3,439,274 | 4/1969 | Morgan | 324—154 X |

ALFRED E. SMITH, Primary Examiner

U.S. Cl. X.R.

324—114